Dec. 26, 1967   H. PELZER   3,360,105
CONVEYOR BELT INSTALLATION
Filed June 8, 1966   2 Sheets-Sheet 1
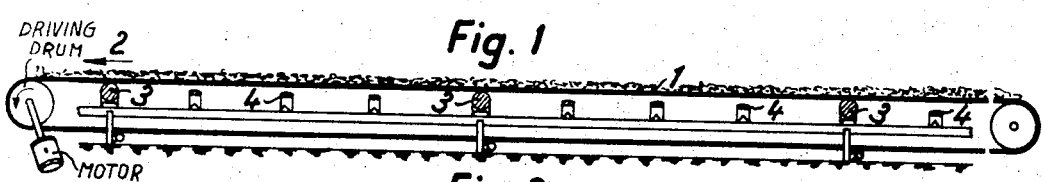
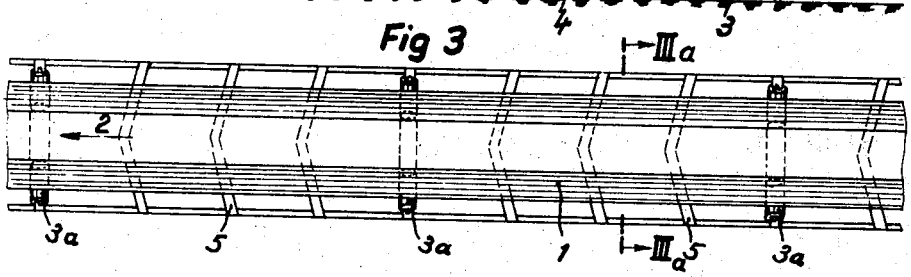
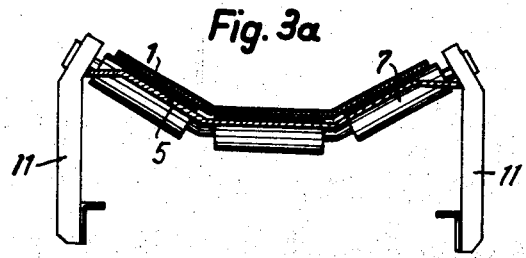
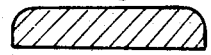
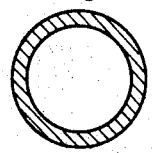
Inventor:
Hans Pelzer
By

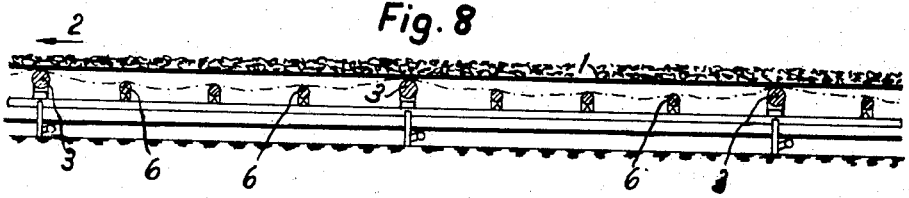
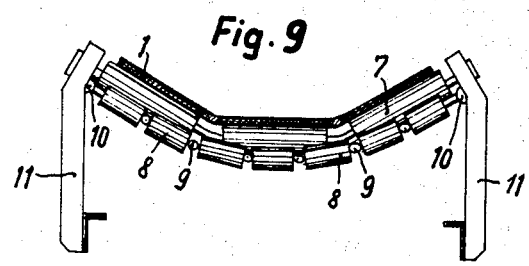
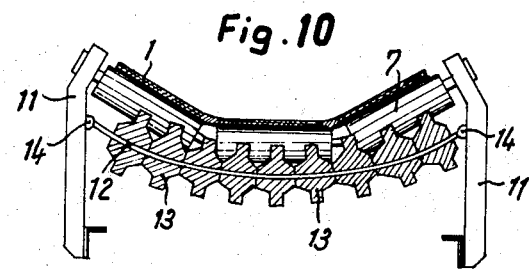
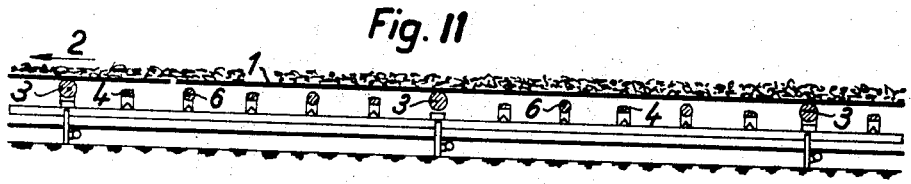
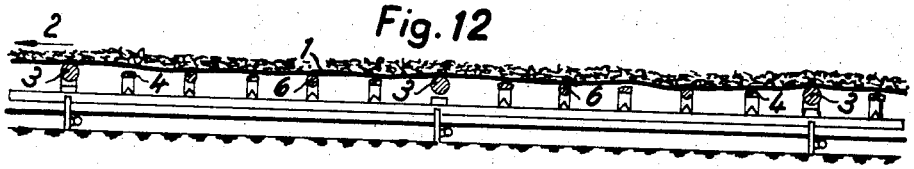
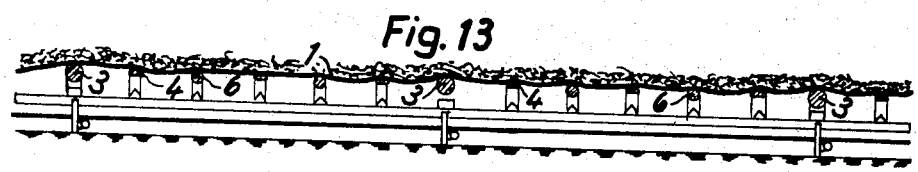

United States Patent Office 3,360,105
Patented Dec. 26, 1967

3,360,105
CONVEYOR BELT INSTALLATION
Hans Pelzer, Krefeld, Germany, assignor to Beteiligungs-
und Patentverwaltungsgesellschaft mit beschrankter
Haftung, Essen, Germany
Filed June 8, 1966, Ser. No. 556,044
Claims priority, application Germany, July 24, 1965,
B 82,984; Oct. 13, 1965, B 84,092; Dec. 9, 1965,
B 84,900
11 Claims. (Cl. 198—129)

ABSTRACT OF THE DISCLOSURE

The present invention concerns a conveyor belt system, which is characterized primarily in that the roller means which continuously support the belt are spaced from each other in the direction of movement of the conveyor belt by such a distance that said belt when at a standstill and supported by said roller means only carrying a load, will hang through unduly between successive sets of supporting roller means, while a plurality of auxiliary supporting means is respectively arranged between and in spaced relationship to adjacent successive sets of supporting roller means, the top surfaces of said auxiliary supporting means being located at a lower level than the top surfaces of said sets of supporting roller means. The pre-stress of the belt at the standstill thereof and the different levels of the top surfaces of said supporting roller means and said auxiliary supporting means respectively being so selected with regard to each other that the loaded conveyor belt when in normal operation will be lifted off said auxiliary supporting means and will be supported by said belt supporting roller means only, whereas when the loaded belt is at a standstill it will partially rest on said auxiliary supporting means.

---

The present invention relates to a conveyor belt installation. The costs for producing a conveyor belt installation are to a great extent determined by the number of the employed belt supporting rollers. This is particularly felt with long conveyor belts which may extend over several miles. Up to the present time it appeared to be impossible to obtain a saving in this respect. If the distances between the supporting rollers were increased over the distances now customary, it would be unavoidable that when the conveyor is stopped and in particular also when it is braked, the belt section under load by the goods to be conveyed would hang down deeply between the rollers in view of the reduced belt tension so that considerable difficulties would be encountered with regard to the operation of the belt.

It is, therefore, an object of the present invention to provide a conveyor belt system which will bring about a considerable saving in cost.

It is another object of this invention to provide a conveyor belt system as set forth in the preceding paragraph, which will permit a greater distance between the belt supporting roller sets while preventing an undue hanging down of the belt section carrying the goods being conveyed.

These and other objects and advantages of the invention will appear more clearly from the following specification in connection with the accompanying drawings, in which:

FIGS. 1 and 2 diagramatically illustrate a longitudinal vertical section through a conveyor belt system in two different conditions of operation.

FIG. 3 is a top view of a conveyor belt system according to the present invention, which is modified over that of FIGS. 1 and 2, and in which the supporting means are arranged in V-shape.

FIG. 3a is a cross section along line IIIa—IIIa in FIG. 3.

FIGS. 4 to 7 respectively illustrate a plurality of different cross sections of auxiliary supporting means or supporting arms for use in connection with the present invention.

FIG. 8 diagrammatically illustrates still another vertical longitudinal section of a modified conveyer belt system according to the present invention.

FIG. 9 is a digrammatic cross section through the upper portion of a further modified conveyor belt system according to the invention.

FIG. 10 similarly to FIG. 9 is a cross section through the upper portion of a still further modification of a conveyor belt system according to the invention.

FIGS. 11 to 13 represent vertical central sections through a portion of a modified conveyor belt system in three different conditions of operation.

The present invention consists primarily in that the distances between the sets of belt supporting rollers are greater than the distances to which the spacing between the roller sets would be limited in order to prevent an undue hanging down of the belt section under load by the goods when the belt is stopped or braked. More specifically, according to the present invention, between the belt supporting rollers there are mounted supporting means in such a way that when starting conveyor operation, the loaded or taut belt section will be lifted off from the supporting means by the pulling force produced by the belt drive. Advantageously, these supporting means which may henceforth be called auxiliary supporting means, in contrast to the supporting means formed by the sets of rollers, are non-rotatably mounted.

Thus, whereas with heretofore known conveyor belt systems it was necessary to support the upper or load sustaining belt section by belt supporting roller sets spaced from each other in the longitudinal direction of the belt by a distance of from one to two and a half meters, the present invention permits increasing the distance between the belt supporting roller sets to four, five, six meters or an even greater distance. Between each two successive belt supporting roller sets there will be mounted a single auxiliary supporting means, or two or more of said auxiliary supporting means in distances of for instance one meter from each other. The distances between the belt supporting roller sets from each other are just sufficient to prevent the load sustaining belt section during the conveyor operation from hanging down by more than from one to two percent of the distance between the belt supporting roller sets. Inasmuch as the pulling force increases in the direction of movement of the belt, the distances of the belt supporting roller sets may be the greater the less the distance of the sets of rollers from the end of the conveying path. The taut belt section moves above the auxiliary supporting means without contacting the same. When the conveyor operation is stopped and consequently the tension of the load sustaining belt section decreases, the latter can rest on the above mentioned auxiliary supporting means so that it will not hang down to an undue extent between the belt supporting rollers. The taut belt section will when the belt is being stopped slip over the said auxiliary supporting means so that it will be braked. Advantageously, the said auxiliary supporting means are equipped with wearing plates so that they will not be subjected to too great a wear during the temporary sliding movement of the belt thereon. Preferably, the said auxiliary supporting means are adapted to the trough shape of the taut belt section so that the said taut belt section when being supported by said auxiliary supporting means will not spread out so that in case pourable goods are conveyed by the conveyor belt, the goods will not be spilled.

Referring now to the drawings in detail and FIG. 1 thereof in particular, belt section 1 conveying pourable goods is assumed to be driven in the direction of the arrow 2. During the conveying operation of the conveyor belt, belt section 1 is supported by the belt supporting rollers 3 only which are rather widely spaced from each other. Between each two successive sets of supporting rollers 3, there are provided auxiliary supporting means 4 extending over the entire width of taut felt section 1. These auxiliary supporting means 4 are so arranged that their upper sides are at a level lower than the highest points of the belt supporting rollers 3. During the conveyor operation according to FIG. 1, the taut belt section 1 is by means of the pulling force of the driving motor kept taut to such an extent that the said belt section 1 will not contact the auxiliary supporting means 4.

FIG. 2 shows the conveyor belt system of FIG. 1 at a time when the drive for the belt has been stopped. Since, therefore, no pulling force is exerted any longer upon the belt section 1 and only a certain preload acts upon the belt, the belt section 1 will under the load of the pourable goods thereon rest upon the auxiliary supporting means 4 between the belt supporting rollers 3.

Inasmuch as the auxiliary supporting means 4 which may be in the form of simple transverse beams or bars save a great number of expensive belt supporting rollers, the arrangement according to the present invention represents a considerable saving in costs. Moreover, the operation of the conveyor belt becomes more economical in view of the fact that the number of belt supporting rollers and bearings which have to be serviced is considerably reduced.

According to a further development of the present invention, the auxiliary supporting means from which the load sustaining belt section is lifted during the operation of the belt will, when seen from above, have the shape of a V the apex of which points in the moving direction of the belt. This is clearly shown in FIG. 3 showing a top view of a portion of the conveyor belt installation with sets of rollers 3a arranged along the contour of a trough, the pourable goods shown on the belt in FIGS. 1 and 2 being omitted in FIG. 3. Also with this arrangement, the upper belt section 1 carrying the pourable goods is during the conveying operation of the belt held in taut condition in view of the pulling force exerted upon the belt in the direction of the arrow 2 by the driving motor for the belt so that the belt will not hang through by more than from one to two percent of the distance by which the sets of rollers 3a are spaced from each other. Therefore, the conveyor belt does not rest upon the auxiliary supporting means 5 which, similar to the auxiliary supporting means of FIGS. 1 and 2, are respectively arranged between successive belt supporting rollers 3. The auxiliary supporting means 5, when viewed from above, have the form of a V the apex of which points in the direction of movement of the belt indicated by the arrow 2. The legs of said V preferably form an obtuse angle with each other. The shape of the auxiliary supporting means 5 substantially conforms to the trough shape of the arrangement of said sets of rollers 3a.

When the drive for the conveyor belt is stopped, the upper belt section 1 will, in addition to resting on the sets of rollers 3a, also rest on the auxiliary supporting means 5 and during the last phase of the movement of the belt immediately prior to stopping, the belt will slide on said auxiliary supporting means 5. It will also be appreciated that if the upper belt section 1 during operation should have moved somewhat toward the side, the auxiliary supporting means 5 will exert an aligning force upon the belt shortly before it stops so as to return the belt to its longitudinal central position.

FIGS. 4 to 7 illustrate various embodiments for the cross sections of the auxiliary supporting means 4 and 5. According to FIGS. 4 and 5 the said auxiliary supporting means comprise a flat iron with rounded upper corners. According to FIG. 6, the auxiliary supporting means have a curved or crowned top surface, whereas according to FIG. 7 the auxiliary supporting means are formed by pipes. FIG. 5 shows an auxiliary supporting means which in contrast to the cross section of FIG. 4 is provided with a wear resistant plate 4a.

However, it is also possible to design the auxiliary supporting means from which the loaded belt section is lifted off during the conveying operation so that they may rotate. In such an instance, the rotatable auxiliary supporting means are designed for a lower permanent load than the belt supporting rollers on which the loaded belt section rests permanently. As indicated diagrammatically in a vertical central section in FIG. 8, between the belt supporting rollers 3 permanently supporting belt section 1, there may be arranged rollers 6 of a smaller diameter than the rollers of said sets of supporting rollers while at the same time the rollers 6 will be located at a lower level than the level at which the sets of supporting rollers 3 are located so that the upper belt section 1 will rest on the auxiliary rollers 6 only after the belt has been stopped. This is indicated by dot-dash lines in FIG. 8. The employment of such smaller rollers 6 which are considerably less expensive than the belt supporting rollers 3, considerably reduces the costs for a conveyor belt installation, particularly when a long conveyor belt is involved. Since the auxiliary rollers are considerably smaller than the belt supporting rollers 3, they also need only smaller bearings which likewise contributes to a saving in the costs for such conveyor belt installations.

According to a further development of the present invention, rotatable auxilary supporting means from which the belt section under load is lifted during the operation of the conveyor are provided which may be designed in the form of a garland. Such an arrangement is shown in FIG. 9 representing a cross section through the upper portion of a conveyor belt installation. The belt supporting rollers 7 which continuously support the upper belt section 1 are arranged in a manner known per se along the contour of a trough. Between each two such trough-shaped roller sets which have a considerable distance from each other there are arranged garland roller sets. These last mentioned auxiliary roller sets are composed of a plurality of rollers 8 the axes of which are interconnected in a chain-like manner by joints 9. These chains are arranged at both ends in joints 10 on the conveyor frame 11. The garland roller sets are arranged at such a level below the level of the belt supporting rollers 7 that during the conveying operation the belt section 1 will not rest on said auxiliary rollers 8 but will rest thereon when the belt is at a standstill.

FIG. 10 likewise shows a cross section through the upper portion of a conveyor belt installation and illustrates that between the trough-shaped arrangement of the belt supporting rollers 7 the belt section 1 continuously rests upon rollers 7. Instead of the garland roller sets 8 shown in FIG. 9, there are however according to FIG. 10 provided ropes 12 having freely rotatably arranged thereon discs 13. Each rope or cable 12 hangs through between its connecting areas 14 on conveyor belt frame 11. The discs 13 are freely rotatable on the respective cable 12. The garland roller sets 8 according to FIG. 9 and also discs 13 threaded on cables 12 as shown in FIG. 10 are less expensive than the customary belt supporting rollers 7 and the bearing means therefor.

Over the still less expensive auxiliary supporting means 4 and 5 according to FIGS. 1 to 7, the employment of rotatable auxiliary supporting means 6, 8 and 13 according to FIGS. 8, 9 and 10 is advantageous particularly when the fact has to be considered that heavy clumps in the pourable goods will exert a particularly local load on the belt so that the belt within the range below such heavy clumps might rest on the rotatably journalled auxiliary supporting means 6, 8 and 13. In view of the rotatability of said auxiliary supporting means the thus loaded belt can move easier over the said auxiliary supporting means than is the case if the said auxiliary supporting means were not rotatable. The rotatably journalled auxiliary supporting means are preferably employed in connection with installations which are frequently stopped and started.

FIGS. 11 to 13 illustrate in vertical longitudinal sections through a portion of a conveyor belt installation three different conditions of operation. As will be seen from these figures, between each two successive sets of belt conveying rollers 3 which continuously support the upper belt section 1 there are rotatably journalled auxiliary supporting means 6 intended for a lower permanent load than rollers 3 as well as nonrotatable auxiliary supporting means 4. This is effected in such a way that the non-rotatable auxiliary supporting means 4 which may consist of simple bars, if desired of the V-shaped design according to FIG. 3, are located at a level slightly lower than the level of the rotatably journaled auxiliary supporting means 6. In conformity with FIG. 8, the rotatably journalled auxiliary supporting means 6 may have a smaller diameter and may be journalled in smaller bearings, or they may be formed by garland sets of rollers according to FIG. 9, or may be formed by discs threaded on cables as shown in FIG. 10.

With the conveyor belt installation according to FIG. 11, the belt section 1 is in view of the pulling force exerted by the driving motor for the belt pulled taut in the direction of the arrow 2 so that the belt will rest neither on the auxiliary rollers 6 nor on the auxiliary supporting means 4. When the said pulling force subsides, belt section 1 will first rest upon auxiliary rollers 6 as shown in FIG. 12 and during the last phase of its movement, after the driving motor has been turned off, will first additionally be supported only by the rotatable auxiliary supporting means. It is only at the very end of the movement of the belt, i.e. when the pulling force exerted by the motor does not exist any longer, that the belt section 1 will in conformity with FIG. 13 additionally rest on the non-rotatable auxiliary supporting means 4.

Inversely, when the movement of the belt is started again, the belt will to the extent to which the pulling force increases be lifted off first from the non-rotatable auxiliary supporting means 4 and subsequently from the auxiliary rollers 6. Also with a design according to FIGS. 11, 12 and 13, the belt supporting rollers may be arranged along the contour of a trough, and the rotatable and non-rotatable auxiliary supporting means which are located at a level lower than the level of the belt supporting rollers may follow the contour of a trough.

The present invention is particularly suitable for long conveyor streets which move over long periods of time in an uninterrupted manner.

It is, of course, to be understood that the present invention, is by no means, limited to the particular arrangement shown in the drawings but also comprises any modifications within the scope of the appended claims.

What I claim is:

1. A conveyor system which includes: frame means, a conveyor belt, a plurality of sets of supporting roller means supported by said frame means for continuously supporting said belt, driving means operatively connected to said belt for selectively moving the same over said sets of supporting roller means, and a plurality of auxiliary supporting means respectively arranged between and in spaced relationship to adjacent successive sets of supporting roller means, the top surfaces of said auxiliary supporting means being located at a lower level than the top surfaces of said sets of supporting roller means, the distance by which adjacent supporting roller means are spaced from each other in the direction of movement of the conveyor belt and the prestress to which said conveyor belt is subjected while being at a standstill and the difference in the level of the top surfaces of said supporting roller means on one hand and of said auxiliary supporting means on the other hand being such that the loaded conveyor belt when in normal operation is lifted off said auxiliary supporting means and is supported by said belt supporting roller means only, whereas said belt when at a standstill and while being loaded is in addition to being supported by said supporting roller means also supported by said auxiliary supporting means to thereby prevent said belt from unduly hanging through between successive sets of supporting roller means.

2. A conveyor system according to claim 1, in which said auxiliary supporting means are non-rotatably supported by said frame means.

3. A conveyor system according to claim 2, in which that surface portion of said auxiliary supporting means which faces the adjacent belt portion is provided with wear resistant plate means.

4. A conveyor system according to claim 1, in which said conveyor belt has a trough-shaped cross-sectional contour, and in which the cross-sectional contour of said auxiliary supporting means is in conformity with the cross-sectional contour of said conveyor belt.

5. A conveyor system according to claim 1, in which the auxiliary supporting means when seen from the top have a V-shaped contour with the apex thereof pointing in the direction of movement of said conveyor belt.

6. A conveyor system according to claim 1, in which said auxiliary supporting means are rotatably supported by said frame means but are of a strength less than said belt supporting roller means.

7. A conveyor system according to claim 6, in which said auxiliary supporting means are formed by supporting rollers having a diameter less than the diameter of said belt supporting roller means.

8. A conveyor system according to claim 6, in which said belt supporting roller means are rotatably journalled in first bearing means, and in which said auxiliary supporting means are rotatably journalled in second bearing means, said first bearing means being considerably stronger than said second bearing means.

9. A conveyor system according to claim 6, in which said auxiliary supporting means are suspended in the manner of and following the contour of garlands.

10. A conveyor system according to claim 6, in which said auxiliary supporting means includes cable means extending transverse to the direction of movement of said conveyor belt and being supported by said frame means, said auxiliary supporting means also including disc means rotatably supported by said cable means.

11. A conveyor system according to claim 1, in which said auxiliary supporting means between adjacent two successive sets of supporting roller means comprises rotatable rollers having the top surface thereof located at a level lower than the top surface of said belt supporting roller means, said auxiliary supporting means also including non-rotatable supporting members having their top surface located at a level lower than the top surface of said rollers, the spacing of the top surface of said rollers and of said supporting members from each other and from the top surface of said belt supporting roller means being so selected that the conveyor belt when in operation and while being loaded is supported by said belt supporting roller means only whereas said belt when moving under load but gradually coming to a stop is successively engaged first by said rollers and subsequently both by said rollers and said supporting members.

References Cited

UNITED STATES PATENTS

| | | | |
|---|---|---|---|
| 858,612 | 7/1907 | Mason | 198—202 |
| 2,457,407 | 12/1948 | Sebastian | 198—184 |
| 3,127,854 | 4/1964 | Reisman | 198—202 |
| 3,200,940 | 8/1965 | Higgins | 198—192 |

EDWARD A. SROKA, *Primary Examiner.*